US006645647B1

United States Patent
Litvinov et al.

(10) Patent No.: US 6,645,647 B1
(45) Date of Patent: Nov. 11, 2003

(54) MAGNETIC RECORDING MEDIA INCLUDING MAGNETICALLY SOFT COMPOSITE LAYER AND METHOD OF MAKING SAME

(75) Inventors: Dmitri Litvinov, Pittsburgh, PA (US); Sakhrat Khizroev, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 126 days.

(21) Appl. No.: 09/760,057

(22) Filed: Jan. 12, 2001

Related U.S. Application Data
(60) Provisional application No. 60/175,858, filed on Jan. 12, 2000.

(51) Int. Cl.$^7$ .............................. G11B 5/66; G11B 5/70
(52) U.S. Cl. .................... 428/694 TM; 428/694 TS; 428/212; 428/213; 428/336; 428/900; 427/130; 427/131; 427/132
(58) Field of Search ............... 428/694 TS, 694 TM, 428/212, 213, 336, 900; 427/130, 131, 132

(56) References Cited

U.S. PATENT DOCUMENTS

| 4,410,603 A | 10/1983 | Yamamori et al. ........... 428/611 |
| 4,629,660 A | 12/1986 | Sagoi et al. ................. 428/678 |
| 5,447,781 A | 9/1995 | Kano et al. .................. 428/212 |
| 5,738,927 A | 4/1998 | Nakamura et al. ........... 428/141 |
| 5,763,108 A | 6/1998 | Chang et al. ............. 428/694 R |
| 5,830,569 A | 11/1998 | Hikosaka et al. ............ 428/332 |
| 5,846,598 A | 12/1998 | Semkow et al. ............... 427/98 |
| 5,895,712 A | 4/1999 | Chen et al. .................. 428/332 |
| 5,900,324 A | 5/1999 | Moroishi et al. ............ 428/611 |
| 5,907,790 A | 5/1999 | Kellam ........................ 428/666 |
| 5,942,342 A | 8/1999 | Hikosaka et al. ........ 428/694 R |
| 6,001,447 A | 12/1999 | Tanahashi et al. .......... 428/65.3 |
| 6,090,480 A | 7/2000 | Hayashi ....................... 428/332 |
| 6,228,515 B1 | 5/2001 | Shin et al. ............. 428/694 TS |
| 6,261,681 B1 | 7/2001 | Suekane et al. ............. 428/332 |
| 6,270,885 B1 | 8/2001 | Hokkyo et al. .............. 428/332 |

FOREIGN PATENT DOCUMENTS

JP 01128226 A * 5/1989

OTHER PUBLICATIONS

Kobayashi et al., "Increase in Thermal Stability of Soft Magnetic Fe–C/Ni–Fe Multilayers with Addition of Ta", Sep. 1990, IEEE Trans. Magn., vol. 26, No. 5, pp. 2338–2340.*

* cited by examiner

*Primary Examiner*—Holly Rickman
(74) *Attorney, Agent, or Firm*—Alan G. Towner, Esq.; Pietragallo, Bosick & Gordon

(57) ABSTRACT

Magnetic recording disks having a composite soft magnetic layer are provided. The soft magnetic layer includes a relatively thick layer of low saturation moment soft magnetic material and a relatively thin layer of high saturation moment soft magnetic material. In a preferred embodiment, the thin layer of soft magnetic material is deposited over the thick layer, followed by deposition of a magnetically hard perpendicular recording layer.

24 Claims, 1 Drawing Sheet

MAGNETIC RECORDING MEDIA INCLUDING MAGNETICALLY SOFT COMPOSITE LAYER AND METHOD OF MAKING SAME

CROSS REFERENCE TO RELATED APPLICATION

This application claims the benefit of U.S. Provisional Patent Application Ser. No. 60/175,858 filed Jan. 12, 2000.

FIELD OF THE INVENTION

The present invention relates to magnetic recording media, and more particularly relates to media such as recording disks for computer disk drive systems which include a soft magnetic layer comprising a multi-layer composite material.

BACKGROUND INFORMATION

Magnetic hard disk drives incorporating longitudinal recording heads are well known. However, as the magnetic volumes of recording bits decrease to support higher areal bit densities, conventional longitudinal media are subject to super paramagnetic instabilities which limit recording densities.

Perpendicular magnetic recording systems have been developed for use in computer hard disk drives. A typical perpendicular recording head includes a trailing main pole, a leading return pole magnetically coupled to the main pole, and an electrically conductive magnetizing coil surrounding the main pole. The bottom of the return pole has a surface area greatly exceeding the surface area of the tip of the main pole. Conventional perpendicular recording media typically include a hard magnetic recording upperlayer and a soft magnetic underlayer which provides a flux path from the trailing write pole to the leading return pole of the writer.

During recording operations, the perpendicular recording head is separated from the magnetic recording media by a distance known as the flying height. The magnetic recording media is moved past the recording head so that the recording head follows the tracks of the magnetic recording media, with the magnetic recording media first passing under the return pole and then passing under the main pole. Current is passed through the coil to create magnetic flux within the main pole. The magnetic flux passes from the main pole tip, through the hard magnetic recording track, into the soft underlayer, and across to the return pole.

When fabricating a perpendicular magnetic recording disk, one of the problems associated with the deposition of the soft underlayer is that the soft underlayer must be relatively thick, e.g., about 500 nm. This is not compatible with standard media sputtering processes where film thickness are typically in the range of about 50 nm. The incompatibility arises because of the timing issues in a standard media deposition processes where it takes only a few seconds to deposit a complete recording layer structure including buffers, seed layers and magnetic layers, while the time required to sputter a relatively thick soft underlayer film, e.g., 500 nm, would be on the order of minutes. This presents a production problem when depositing the soft underlayer and recording layer with conventional fabrication tools. The present invention has been developed in view of the foregoing.

SUMMARY OF THE INVENTION

An aspect of the present invention is to provide a magnetic recording disk including a magnetically soft layer and a magnetically hard recording layer. The magnetically soft layer includes a relatively thin layer of high saturation moment material and a relatively thick layer of low saturation moment material.

Another aspect of the present invention is to provide a method of making a soft magnetic layer of a magnetic recording disk. The method includes the steps of depositing a relatively thick layer of soft magnetic low saturation moment material on the disk, and depositing a relatively thin layer of high saturation moment soft magnetic material on the disk.

These and other aspects of the present invention will be more apparent from the following description.

DETAILED DESCRIPTION

Figure 1:
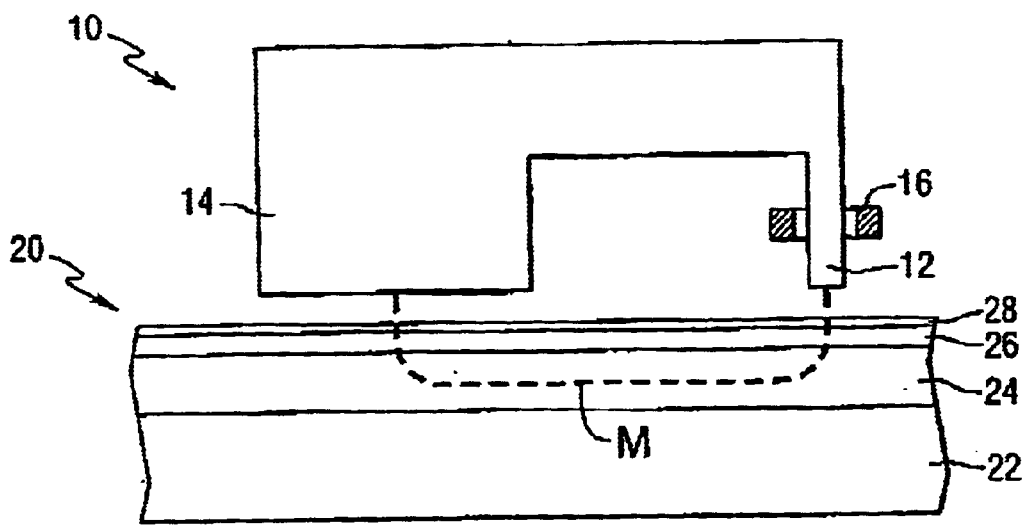
FIG. 1 is a partially schematic side sectional view of a perpendicular magnetic recording head and recording disk.

FIG. 1 illustrates a conventional perpendicular magnetic recording head 10 which includes a trailing main write pole 12 and a leading return pole 14. A magnetizing coil 16 surrounds the main pole 12. The perpendicular recording head 10 is positioned above a magnetic recording disk 20. The disk 20 includes a substrate 22, a soft magnetic underlayer 24, a hard magnetic recording layer 26 and a protective layer 28. When current is passed through the coil 16, a magnetic field is generated which travels along a flux path M from the tip of the main pole 12 perpendicularly through the recording layer 26, across the soft underlayer 24 to the return pole 14. The soft underlayer 24 is thus used to provide a flux path between the main pole 12 and return pole 14.

In accordance with the present invention, in order to achieve a magnetic recording system with improved performance, the saturation moment BS of the soft underlayer 24 should be at least as high as the saturation moment of the pole tip 12 of the recording head. Consequently, a high moment material should be used, e.g. FeAlN or CoFe alloys, for the soft underlayer to achieve strong magnetic fields (e.g., about 80% of 4BMs) and sharp trailing gradients. However, it is not necessary for the entire soft underlayer to be made of high moment material. To achieve satisfactory performance of a perpendicular recording system, only a relatively thin part of the soft underlayer that is adjacent to the hard magnetic recording layer needs to be made of a high saturation moment material. This is because only a part of the soft underlayer adjacent to the hard magnetic recording layer defines the recording field (magnitude and gradients). The rest of the soft underlayer acts as a path for the magnetic flux and can be made of any suitable soft magnetic material of appropriate thickness.

Figure 2:
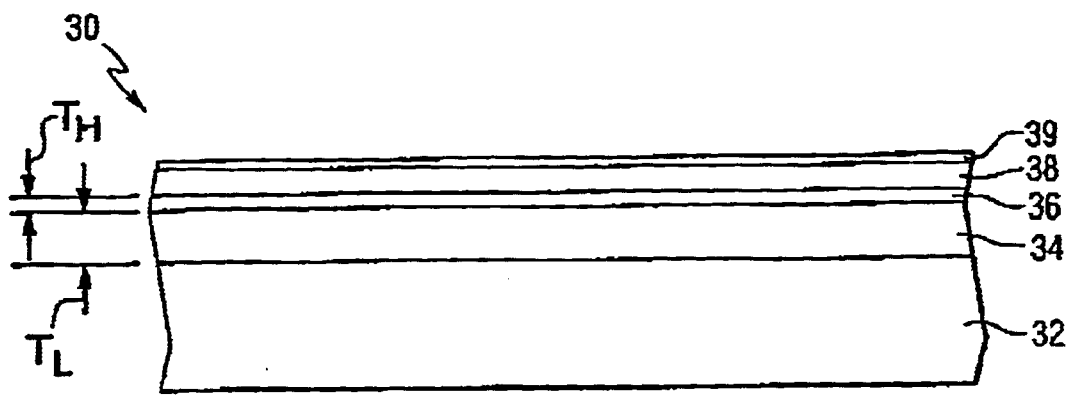
FIG. 2 is a side sectional view of a magnetic recording disk in accordance with an embodiment of the present invention. The disk includes a soft magnetic underlayer which comprises a relatively thick layer of low saturation moment soft magnetic material and a relatively thin layer of high saturation moment soft magnetic material.

FIG. 2 is a side view of a perpendicular magnetic recording disk 30 in accordance with an embodiment of the present invention. For purposes of clarity, the layers of the disk 30 are not drawn to scale. The disk 30 includes a substrate 32 which may be made of any suitable material such as ceramic glass, amorphous glass or NiP plated AlMg. A relatively thick layer of low moment soft magnetic material 34 is deposited on the substrate 32. A relatively thin layer of high saturation moment soft magnetic material 36 is deposited on the layer 34. As used herein, the terms "low saturation moment" and "high saturation moment" are relative and mean that the layer 34 has a lower saturation moment BS than the layer 36. A hard magnetic recording layer 38 is deposited on the soft magnetic layer 36. The magnetic recording layer 38 typically has a thickness of from about 1 to about 50 nm, and may be made of any suitable material such as hcp Co alloys (CoCrTa, CoCrPt, CoCrPtB, etc.), magnetic multi layers (Co/Pt, Co/Pd) or L10 phases of CoPt, CoPd, FePt, FePd or L10 alloys. The recording layer 38 may have a predominant easy axis of magnetization perpendicular to the plane of the disk 30. A protective layer 39 made of a material such as diamond-like carbon may optionally be deposited on the recording layer 38.

As shown in FIG. 2, the low saturation moment soft magnetic layer 34 has a thickness $T_L$ that is relatively large in comparison with the thickness $T_H$ of the high saturation moment soft magnetic material 36. The ratio of $T_L:T_H$ may be at least 2:1, for example, at least 5:1. In a particular embodiment, the relatively thick, low saturation moment layer 34 comprises from about 90 to about 99 percent of the total thickness of the magnetically soft layer 34, 36, and the relatively thin, high saturation moment layer 36 comprises from about 1 to about 10 percent of the total thickness of the magnetically soft layer. The low saturation moment layer 34 may have a thickness of from about 0.5 to about 2,000 nm, while the high saturation moment layer 36 may have a thickness of from about 1 to about 3,000 nm or higher.

The low saturation moment layer 34 may have a $B_S$ that is at least about 5 percent less than the high saturation moment layer 36, for example, at least about 20 percent less than the high saturation moment layer 30. The high moment layer 36 preferably has a moment of greater than 1.6 or 1.8 Tesla. For example, Permalloy has a saturation moment $B_S$ of about 1 Tesla, which is about 50 percent of FeAlN ($B_S$=2 Tesla) or 40 percent of CoFe ($B_S$=2.5 Tesla), Ni45Fe55 has a magnetic moment of 1.6 Tesla or 80 percent of FeAlN and 64 percent of CoFe.

The low saturation moment layer 34 may be made of any suitable magnetically permeable material such as Permalloy (which contains about 20 wt. % Fe and about 80 wt. % Ni), Ni45Fe55 or the like. The high saturation moment layer 36 may be made of any suitable material such as FeAlN, FeTaN, CoFe, CoFeB, CoFeN or the like.

The layer 34 of the soft underlayer can be deposited first by a high throughput process such as plating that can. support high manufacturing volumes. Since the plated soft underlayer film will most probably have a higher than acceptable surface roughness, a polishing step, e.g., chemical mechanical polishing (CMP), may be used to make the films smooth. As an alternative to plating, processes such as high-rate sputtering may be used to deposit the relatively thick layer of low momentmaterial. A thin layer of high moment material is then deposited by techniques, such as (magnetron) sputtering, reactive (magnetron) sputtering or ion-beam deposition. (IBD). For example, an 80 nm film of FeAlN can be deposited on the low moment layer by a reactive magnetron sputtering of FeAl alloy in a mixture of argon and nitrogen (up to 10 percent of N) in a conventional media deposition tool followed by deposition of the recording layer stack. Accordingly, the soft underlayer film is deposited in multiple steps.

Figure 3:
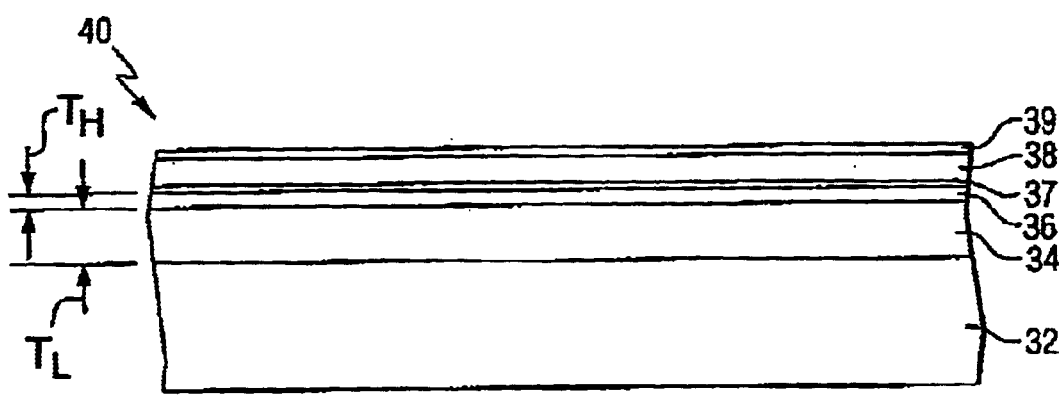
FIG. 3 is a side sectional view of a magnetic recording disk similar to the disk of FIG. 2, with the addition of an exchange decouple layer between the soft magnetic layer and hard magnetic recording layer of the disk.

FIG. 3 is a side view of a magnetic recording disk 40 similar to the disk of FIG. 2, with the addition of an exchange decouple layer 37 between the soft magnetic layer 36 and the hard magnetic recording layer 38. The exchange decouple layer 37 typically has a thickness of from about 1 to about 10 nm, and may be made of any suitable non-magnetic material such as CoCr, Ta or Ti. The purpose of the exchange decouple layer 37 is to exchange decouple the soft underlayer from the magnetic recording layer. In the absence of such a layer, the recording layer may modify the magnetic properties of the soft underlayer, possibly reducing the magnetic permeability of part of the soft underlayer. Also, exchange coupling between the soft underlayer and hard magnetic layer may increase the exchange coupling between grains in the hard magnetic layer, which may result in the loss of the magnetic system resolution.

Although the magnetic recording disks shown in FIGS. 2 and 3 are used for perpendicular recording with the magnetically soft layer 34, 36 located under the perpendicular recording layer 38, other types of arrangements may be possible. For example, a longitudinal recording disk (not shown) may be provided, in which case the composite soft magnetic layer could be deposited over a hard magnetic longitudinal recording layer. Thus, the longitudinal recording layer would be deposited on the substrate, followed by the high moment soft magnetic layer, and then the low moment soft magnetic layer.

The following example is intended to illustrate various aspects of the present invention, and is not intended to limit the scope of the invention.

EXAMPLE

A recording disk was made in a conventional media deposition tool, Circulus M-12, manufactured by Balzers. Ceramic glass substrates were used. The following media structures were tested: substrate/Ta/NiFe/Ta/FeAlN/Ta/ITO/(Co/Pd)x/C:H-overcoat; and substrate/Ta/NiFe/Ta/FeAlN/Ti/CoCrPtTa/C:H-overcoat. Lower saturation moment Ni45Fe55 material 300 nm thick was covered with 5 nm Ta deposited in a separate run. FeAlN in a thickness range of from 20 nm to 100 nm was deposited next, followed by the deposition of 5 nm thick decoupling layers (indium/tin oxide (ITO) for the multilayer structure and Ti for the CoCrPtTa alloy), which also acted as a buffer layer to define microstructure of the hard magnetic layer. A 30 nm layer of Co/Pd multilayer and 40 nm of CoCrPtTa recording layer were then deposited. For comparison, the same recording layers were deposited on a single layer soft underlayer. Spin stand testing revealed no difference between the recording characteristics of the two types of media. Auto-correlation signal to noise ratio (SNR) using a pseudo-random sequence of bits covering a spectral range up to 200 kfci was measured for the media with laminated and single layer soft underlayer (Co/Pd recording layer). An increase in SNR of 4 dB was observed in going from the single layer soft underlayer (~12 dB) to the FeAlN/Ta/NiFe laminated soft underlayer (~16 dB). Since the recording layers in both cases were identical and the soft underlayer noise usually manifests itself at lower recording densities (up to ~100 kfci), the boost in SNR is attributed to the reduction of soft underlayer noise. Thus, it is evident that the composite structure of the soft underlayer lead to the reduction of soft underlayer noise.

The present invention provides an efficient process for soft underlayer deposition. Since the process may use existing deposition techniques, it presents a significant potential to produce inexpensive magnetic recording media such as perpendicular media with a soft underlayer. Furthermore, an additional advantage of the present invention is that high moment materials such as FeAlN and FeTaN tend to have significant amounts of residual stress that may present a problem for adhesion. The use of materials such as Permalloy as a major part of the soft underlayer reduces the amount of the residual stress.

Whereas particular embodiments of this invention have been described above for purposes of illustration, it will be evident to those skilled in the art that numerous variations of the details of the present invention may be made without departing from the invention as defined in the appended claims.

What is claimed is:

1. A magnetic recording disk comprising a magnetically hard recording layer and a magnetically soft layer, wherein the magnetically soft layer includes a layer of low saturation moment magnetically soft material and a layer of high saturation moment magnetically soft material having a higher saturation moment than the low saturation moment magnetically soft material adjacent to the magnetically hard recording layer, and the layer of high saturation moment magnetically soft material is thinner than the layer of low saturation moment magnetically soft material.

2. The magnetic recording disk of claim 1, wherein the magnetically hard recording layer is deposited over the magnetically soft layer.

3. The magnetic recording disk of claim 2, wherein the layer of high saturation moment magnetically soft material is deposited directly on the layer of low saturation moment magnetically soft material.

4. The magnetic recording disk of claim 2, wherein the magnetically hard recording layer comprises a material having a predominant easy axis of magnetization perpendicular to a plane of the disk.

5. The magnetic recording disk of claim 1, wherein the layer of low saturation moment magnetically soft material has a thickness at least 5 times greater than the thickness of the layer of high saturation moment magnetically soft material.

6. The magnetic recording disk of claim 1, wherein the layer of low moment magnetically soft material comprises from about 90 to about 99 percent of the total thickness of the magnetically soft layer.

7. The magnetic recording disk of claim 1, wherein the layer of high saturation moment magnetically soft material comprises from about 1 to about 10 percent of the total thickness of the magnetically soft layer.

8. The magnetic recording disk of claim 1, wherein the layer of low saturation moment magnetically soft material has a thickness of from about 1 to about 3,000 nm.

9. The magnetic recording disk of claim 1, wherein the layer of high moment magnetically soft material has a thickness of from about 0.5 to about 2,000 nm.

10. The magnetic recording disk of claim 1, wherein the layer of high saturation moment magnetically soft material has a BS of greater than 1.6 Tesla.

11. The magnetic recording disk of claim 1, wherein the layer of high saturation moment magnetically soft material has a BS of greater than 1.8 Tesla.

12. The magnetic recording disk of claim 1, wherein the layer of low saturation moment magnetically soft material comprises Permalloy.

13. The magnetic recording disk of claim 1, wherein the layer of high saturation moment magnetically soft material comprises at least one material selected from the group consisting of FeAlN, FeTaN and CoFe.

14. The magnetic recording disk of claim 1, further comprising an exchange decouple layer between the magnetically hard recording layer and the magnetically soft layer.

15. A method of making a soft magnetic layer of a magnetic recording disk, the method comprising:
   depositing a layer of low saturation moment soft magnetic material on the disk; and
   depositing a layer of high saturation moment magnetically soft material having a higher saturation moment than the low saturation moment magnetically soft material over the layer of low saturation moment magnetically soft material, wherein the layer of high saturation moment magnetically soft material is thinner than the layer of low saturation moment magnetically soft material.

16. The method of claim 15, further comprising the step of polishing the surface of the layer of low saturation moment magnetically soft material before the layer of high saturation moment magnetically soft material is deposited.

17. The method of claim 15, wherein the layer of low saturation moment magnetically soft material is deposited by plating.

18. The method of claim 15, further comprising the step of depositing a magnetically hard recording layer over the soft magnetic layer.

19. A magnetic recording disk comprising a magnetically hard recording layer and a magnetically soft layer, wherein the magnetically soft layer includes a layer of low saturation moment magnetically soft material and a layer of high saturation moment magnetically soft material having a higher saturation moment than the low saturation moment magnetically soft material adjacent to the magnetically hard recording layer, and the layer of low saturation moment magnetically soft material has a thickness at least five times greater than the layer of high saturation moment magnetically soft material.

20. A magnetic recording disk comprising a magnetically hard recording layer and a magnetically soft layer, wherein the magnetically soft layer includes a layer of low saturation moment magnetically soft material and a layer of high saturation moment magnetically soft material having a higher saturation moment ,than the low saturation moment magnetically soft material adjacent to the magnetically hard recording layer, the layer of high saturation moment magnetically soft material is thinner than the layer of low saturation moment magnetically soft material, and the layer of high saturation moment magnetically soft material has a $B_S$ of greater than 1.6 Tesla.

21. A magnetic recording disk comprising a magnetically hard recording layer and a magnetically soft layer, wherein the magnetically soft layer includes a layer of low saturation moment magnetically soft material and a layer of high saturation moment magnetically soft material having a higher saturation moment than the low saturation moment magnetically soft material adjacent to the magnetically hard recording layer, the layer of high saturation moment magnetically soft material is thinner than the layer of low saturation moment magnetically soft material, and the layer of high saturation moment magnetically soft material comprises at least one material selected from the group consisting of FeAlN, FeTaN and CoFe.

22. A magnetic recording disk comprising a magnetically hard recording layer, a magnetically soft layer and an exchange decouple layer between the magnetically hard recording layer and the magnetically soft layer, wherein the magnetically soft layer includes a layer of low saturation moment magnetically soft material and a layer of high saturation moment magnetically soft material having a higher saturation moment than the low saturation moment magnetically soft material adjacent to; the magnetically hard recording layer, and the layer of high saturation moment magnetically soft material is thinner than the layer of low saturation moment magnetically soft material.

23. A method of making a soft magnetic layer of a magnetic recording disk, the method comprising:

depositing a layer of low saturation moment soft magnetic material on the disk;

polishing the surface of the layer of low saturation moment magnetically soft material; and depositing a layer of high saturation moment magnetically soft material having a higher saturation moment than the low saturation moment magnetically soft material over the layer of low saturation moment magnetically soft material, wherein the layer of high saturation moment magnetically soft material is thinner than the layer of low saturation moment magnetically soft material.

24. A method of making a soft magnetic layer of a magnetic recording disk, the method comprising:

depositing a layer of low saturation moment soft magnetic material on the disk by plating; and depositing a layer of high saturation moment magnetically soft material having a higher saturation moment than the low saturation moment magnetically soft material over the layer of low saturation moment magnetically soft material, wherein the layer of high saturation moment magnetically soft material is thinner than the layer of low saturation moment magnetically soft material.

* * * * *